(12) United States Patent
McNally et al.

(10) Patent No.: US 10,330,183 B2
(45) Date of Patent: Jun. 25, 2019

(54) TWO-SPEED ACTIVE TRANSFER CASE

(71) Applicant: Magna Powertrain of America, Inc., Troy, MI (US)

(72) Inventors: Joseph P. McNally, Clarkston, MI (US); Daniel M. Drill, Rochester, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 354 days.

(21) Appl. No.: 15/170,991

(22) Filed: Jun. 2, 2016

(65) Prior Publication Data

US 2016/0363201 A1    Dec. 15, 2016

Related U.S. Application Data

(60) Provisional application No. 62/174,365, filed on Jun. 11, 2015.

(51) Int. Cl.
| | | |
|---|---|---|
| *B60K 17/34* | (2006.01) | |
| *B60K 17/35* | (2006.01) | |
| *B60K 17/342* | (2006.01) | |
| *B60K 23/02* | (2006.01) | |
| *F16H 37/06* | (2006.01) | |
| *B60K 17/346* | (2006.01) | |
| *B60K 17/348* | (2006.01) | |
| *F16H 57/04* | (2010.01) | |

(Continued)

(52) U.S. Cl.
CPC .......... *F16H 37/065* (2013.01); *B60K 17/348* (2013.01); *B60K 17/3467* (2013.01); *F16H 57/043* (2013.01); *F16H 57/0441* (2013.01); *F16H 57/0457* (2013.01); *F16H 57/0483* (2013.01); *F16H 61/0204* (2013.01); *F16H 63/18* (2013.01)

(58) Field of Classification Search
CPC ............ B60K 17/3567; B60K 17/3462; B60K 17/342; B60K 23/0808
See application file for complete search history.

(56) References Cited

U.S. PATENT DOCUMENTS

| | | | | |
|---|---|---|---|---|
| 6,283,887 B1* | 9/2001 | Brown | ............... | B60K 17/3467 180/249 |
| 6,354,977 B1* | 3/2002 | Brown | ............... | B60K 17/3467 180/349 |

(Continued)

FOREIGN PATENT DOCUMENTS

WO    WO2009035678 A1    3/2009

*Primary Examiner* — Tisha D Lewis
(74) *Attorney, Agent, or Firm* — Dickinson Wright PLLC

(57) ABSTRACT

A two-speed active transfer case includes an input shaft adapted to receive drive torque from a powertrain, a rear output shaft adapted for connection to a rear driveline and aligned with the input shaft for rotation about a first rotary axis, a front output shaft adapted for connection to a front driveline and aligned for rotation about a second rotary axis, and a transfer mechanism driven by the rear output shaft. The transfer case also includes a two-speed range mechanism operably disposed between the input shaft and the rear output shaft, a range shift mechanism for controlling operation of the two-speed range mechanism, a mode mechanism operably disposed between the transfer mechanism and the front output shaft, and a mode shift mechanism for controlling operation of the mode mechanism.

17 Claims, 9 Drawing Sheets

(51) Int. Cl.
*F16H 61/02* (2006.01)
*F16H 63/18* (2006.01)

(56) References Cited

U.S. PATENT DOCUMENTS

| | | |
|---|---|---|
| 6,652,407 B2 | 11/2003 | Ronk et al. |
| 7,033,300 B2 | 4/2006 | Mueller et al. |
| 7,377,871 B2 | 5/2008 | Bowen |
| 7,694,598 B2 | 4/2010 | Kriebernegg et al. |
| 7,753,173 B2 | 7/2010 | Gratzer et al. |
| 8,091,451 B2 | 1/2012 | Wolfsjager et al. |
| 8,157,072 B2 | 4/2012 | Bowen |
| 8,316,738 B2 | 11/2012 | Hellinger et al. |
| 8,650,980 B2 | 2/2014 | Lafer et al. |
| 8,678,158 B2 | 3/2014 | Sachsenmaier et al. |
| 8,821,334 B2 | 9/2014 | Mueller et al. |
| 2006/0105883 A1 | 5/2006 | Krisher et al. |
| 2015/0158383 A1* | 6/2015 | Mastie ............... B60K 17/3467 475/204 |
| 2016/0176407 A1* | 6/2016 | Sharma ................ B60K 17/08 701/58 |
| 2016/0341300 A1* | 11/2016 | Drill .................. F16H 57/0457 |

\* cited by examiner

TWO-SPEED ACTIVE TRANSFER CASE

CROSS-REFERENCE TO RELATED APPLICATIONS

This application claims the benefit of U.S. Provisional Patent Application Ser. No. 62/174,365 file on Jun. 11, 2015, and titled "TWO-SPEED ACTIVE TRANSFER CASE", the entire disclosure of which is hereby incorporated by reference.

FIELD

The present disclosure relates generally to power transfer systems for controlling the distribution of drive torque from a powertrain to the front and rear drivelines of a four-wheel drive motor vehicle. More particularly, the present disclosure is directed to a two-speed transfer case having a front output shaft equipped with an actively-controlled mode clutch and a splash recovery clutch.

BACKGROUND

This section provides background information related to the present disclosure which is not necessarily prior art.

In view of increased consumer popularity in four-wheel drive vehicles, power transfer systems are currently being utilized in vehicular drivetrain applications for selectively directing power (i.e., drive torque) from the powertrain to all four wheels of the vehicle. In many power transfer systems, a transfer case is incorporated into the drivetrain and is operable in a four-wheel drive mode for delivering drive torque from the powertrain to both the front and rear wheels. Many conventional transfer cases are equipped with a mode shift mechanism that can be selectively actuated to shift between a two-wheel drive mode and a locked four-wheel drive mode. In addition, many transfer cases also include a range shift mechanism which can be selectively actuated by the vehicle operator for shifting between four-wheel high-range and low range drive modes.

It is also known to use "on-demand" power transfer systems for automatically distributing drive torque between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a multi-plate friction clutch assembly and a power-operated clutch actuator that are interactively associated with an electronic control system and a sensor arrangement. During normal road conditions, the friction clutch assembly is typically maintained in a released condition such that drive torque is only delivered to the rear wheels. However, when the sensors detect a low traction condition, the clutch actuator is actuated to engage the friction clutch assembly for transmitting drive torque "on-demand" to the front wheels. Moreover, the amount of drive torque transferred through the friction clutch assembly to the front wheels can be varied as a function of specific vehicle dynamics and operating characteristics, as detected by the sensor arrangement.

A majority of current on-demand transfer cases are configured to include a rear output shaft interconnecting the transmission output to the rear driveline, a front output shaft interconnected to the front driveline, a transfer assembly interconnected to the front output shaft, and the friction clutch assembly which is operably arranged to couple the transfer assembly to the rear output shaft for transmitting drive torque to the front driveline. Typically, the transfer assembly includes a first sprocket rotatably supported on the rear output shaft, a second sprocket fixed to the front output shaft, and a chain encircling and drivingly interconnecting the first sprocket for common rotation with the front output shaft. The friction clutch assembly and components of the power-operated clutch actuator are disposed to surround the rear output shaft and function to couple the first sprocket to the rear output shaft. Examples of such on-demand or "active" transfer cases are disclosed in U.S. Pat. Nos. 8,091,451; 8,316,738; and 8,678,158.

Such active transfer cases also require a lubrication system for lubricating the clutch assembly and other rotary components mounted on the rear output shaft. A sump of lubricant is maintained in a lower portion of the transfer case so as to typically submerge at least a portion of the second sprocket. A passive lubrication system utilizes lubricant splashed throughout the transfer case upon rotation of the sprockets to lubricate the rotary components and cool the clutch assembly. Examples of transfer cases equipped with passive lubrication systems are shown in U.S. Pat. Nos. 7,753,173 and 8,650,980. As an alternative, a shaft-driven lube pump, such as a gerotor pump, can be operably associated with the rear output shaft to pump lubricant from the sump and distribute the lubricant in response to rotation of the rear output shaft. Finally, it is also known to equip the transfer case with an electric lube pump that can be controlled to provide adaptive lubricant flow.

In the past, the vehicle ride height and suspension configuration of many trucks and sport utility vehicles provided sufficient packaging volume for such traditional active transfer cases. However, in view of increased demand for smaller four-wheel drive vehicles, the packaging volume allocated to the powertrain and the transfer case has been greatly reduced. As such, some transfer cases have been developed which position the friction clutch assembly and the power-operated clutch actuator on the front output shaft. One example of such an on-demand transfer cases can be seen in U.S. Pat. No. 8,157,072.

While such alternative transfer cases address the need for reduced packaging requirements, a need still exists to advance the technology and structure of transfer cases to provide enhanced arrangements that improve upon the prior art.

SUMMARY

This section provides a general summary of the disclosure and is not intended to be interpreted as a complete and comprehensive disclosure of all of its features, advantages, objectives and aspects.

It is an aspect of the present disclosure to provide a two-speed active transfer case for use in four-wheel drive vehicles that is operable to transmit drive torque through a multi-plate friction clutch assembly.

It is a related aspect of the present disclosure to provide such a two-speed active transfer case configured to locate the multi-plate friction clutch assembly and a splash recovery clutch lubrication system in association with a front output shaft.

It is another related aspect of the present disclosure to provide the two-speed active transfer case equipped with manually-operable and power-operated versions of a range shift mechanism for permitting establishment of high-range and low-range drive connections.

In view of these and other aspects and objectives of the present disclosure, a two-speed active transfer case is provided and includes an input shaft adapted to receive drive torque from a powertrain, a rear output shaft adapted for connection to a rear driveline and aligned with the input shaft for rotation about a first rotary axis, a front output shaft adapted for connection to a front driveline and aligned for rotation about a second rotary axis, a transfer mechanism driven by the rear output shaft, a two-speed range mechanism operably disposed between the input shaft and the rear output shaft, a range shift mechanism for controlling operation of the two-speed range mechanism, a mode mechanism operably disposed between the transfer mechanism and the front output shaft, and a mode shift mechanism for controlling operation of the mode mechanism.

In accordance with one embodiment, the two-speed active transfer case of the present disclosure includes a mode mechanism configured as a friction clutch assembly at least partially disposed in a sump of lubricant and having a first clutch member driven by a transfer component of the transfer mechanism, a second clutch member driven by the front output shaft, and a multi-plate clutch pack disposed therebetween. The mode shift mechanism includes a motor-actuated ballramp unit configured to control the clutch engagement force exerted on the multi-plate clutch pack. The range mechanism includes a planetary gearset driven by the input shaft and a range clutch operable to move between at least two range positions for establishing two distinct speed ratio drive connections between the input shaft and the rear output shaft. The range shift mechanism includes a range fork engaging the range clutch and an arrangement for moving the range fork so as to move the range clutch between its two range positions.

In accordance with this embodiment, the range shift mechanism is manually operated via a mode selector in the vehicle passenger compartment and a control system controls coordinated actuation of the motor-actuated ballramp unit. In accordance with an alternative embodiment, the range shift mechanism includes a separate power-operated device configured to control movement of the range clutch. In yet a further alternative embodiment, movement of the range fork and actuation of the ballramp unit are controlled and coordinated by a single power-operated shift actuator mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
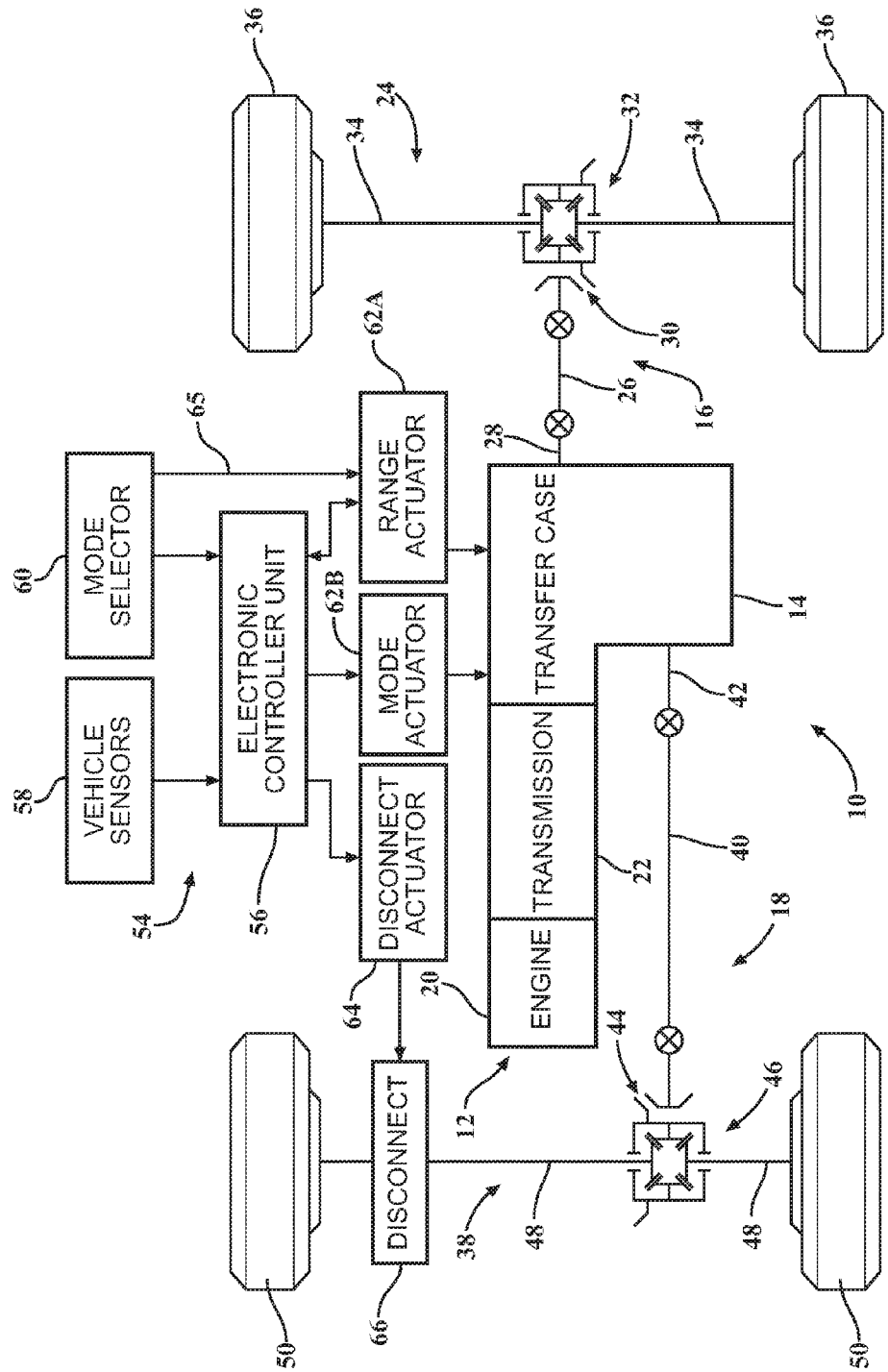
FIG. 1 is a schematic illustration of a four-wheel drive motor vehicle equipped with a power transfer system having a two-speed active transfer case constructed in accordance with the teachings of the present disclosure.

Example embodiments will now be described more fully with reference to the accompanying drawings. In particular, at least five example embodiments of a two-speed active transfer case adapted for use with four-wheel drive vehicles are provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example drivetrain for a four-wheel drive motor vehicle 10 is shown to include a powertrain 12 operable to generate rotary power (i.e., drive torque) which is transmitted through a power transfer unit, hereinafter transfer case 14, to a primary driveline 16 and to a secondary driveline 18. Powertrain 12 is shown, in this non-limiting example, to include a power source such as an internal combustion engine 20 and a transmission 22. In the particular arrangement shown, primary driveline 16 is a rear driveline and generally includes a rear axle assembly 24 and a rear propshaft 26 arranged to drivingly interconnect a rear output shaft 28 of transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown to include a traction control system 54 having an electronic controller unit 56 configured to receive input signals from vehicle sensors 58 and a mode selector 60 and to subsequently provide control signals to one or more actuators. Mode selector 60 is, in this non-limiting example, a manually-operable device within the passenger compartment of vehicle 10 and, for example, may include a shift lever. Controller unit 56 can provide control signals to one or more transfer case actuators 62 and an axle disconnect actuator 64. As will be detailed with greater specificity, the at least one transfer case actuators 62 may include a range actuator 62A associated with a two-speed range mechanism to provide high-range and low-range drive connections, and/or a mode actuator 62B associated with a mode mechanism to provide two-wheel drive and four-wheel drive modes of operation.

In the particular embodiments of transfer case 14 to be described hereinafter, mode selector 60 is adapted to mechanically operate range actuator 62A to control operation of the two-speed range shift mechanism, as indicated by leadline 65. Range actuator 62A, in such embodiments, provides a range signal to ECU 56 that is indicative of the particular drive connection (namely, the high-range or the low-range) selected and established. Disconnect actuator 64 controls operation of a disconnect device 66 associated with front axle assembly 38 for selectively coupling and uncoupling front driveline 18 relative to transfer case 14. Sensors 58 are configured to provide information to controller unit 56 indicative of the current operational characteristics of vehicle 10 and/or road conditions for use in controlling operation of transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2WH) drive mode, an automatic four-wheel high-range (AUTO-4WH) drive mode, a locked four-wheel high-range (LOCK-4WH) drive mode, a Neutral mode, a locked four-wheel low-range (LOCK-4WL) drive mode, and an automatic four-wheel low-range (AUTO-4WL) drive mode.

Figure 2A:
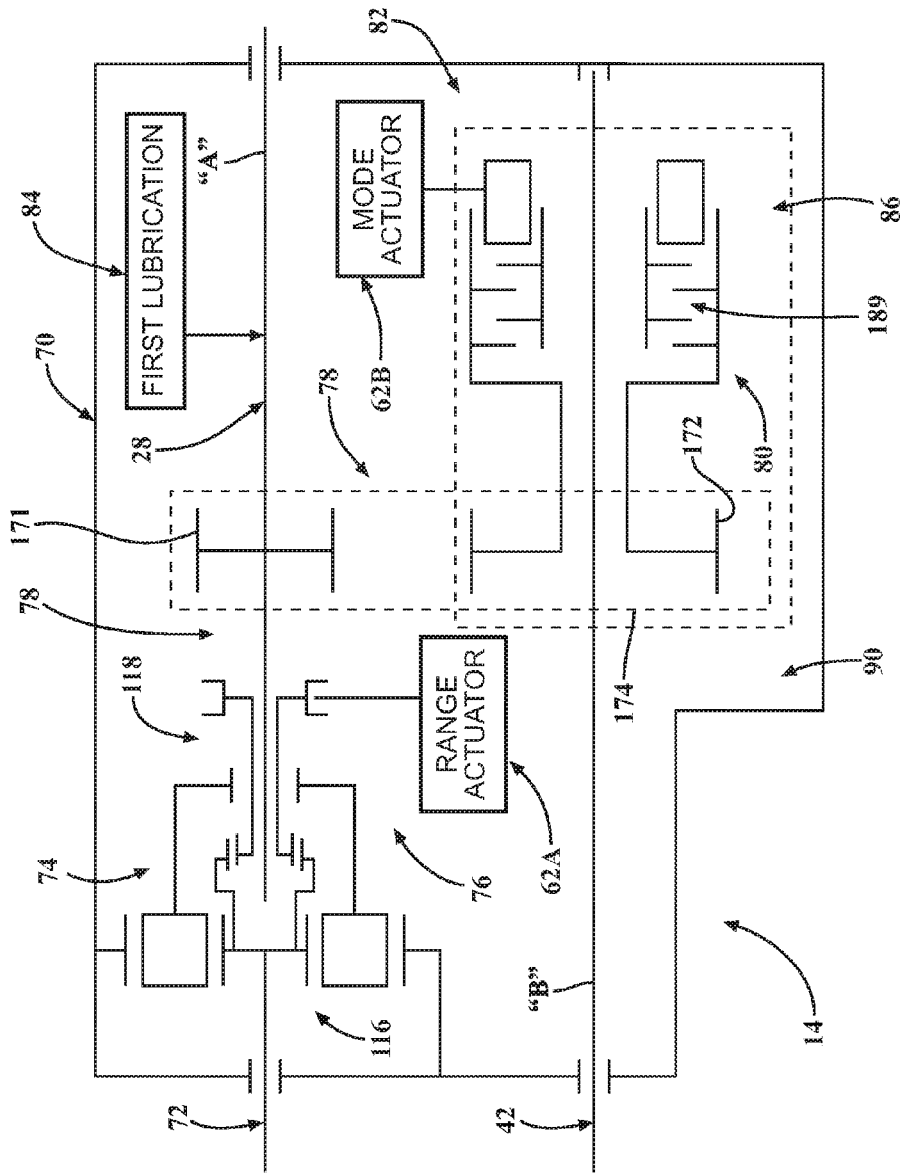
FIG. 2A is a diagrammatical illustration of a two-speed active transfer case having an adaptively-controlled multi-plate friction clutch assembly associated with its front output shaft and which embodies the teachings of the present disclosure.
Figure 2B:
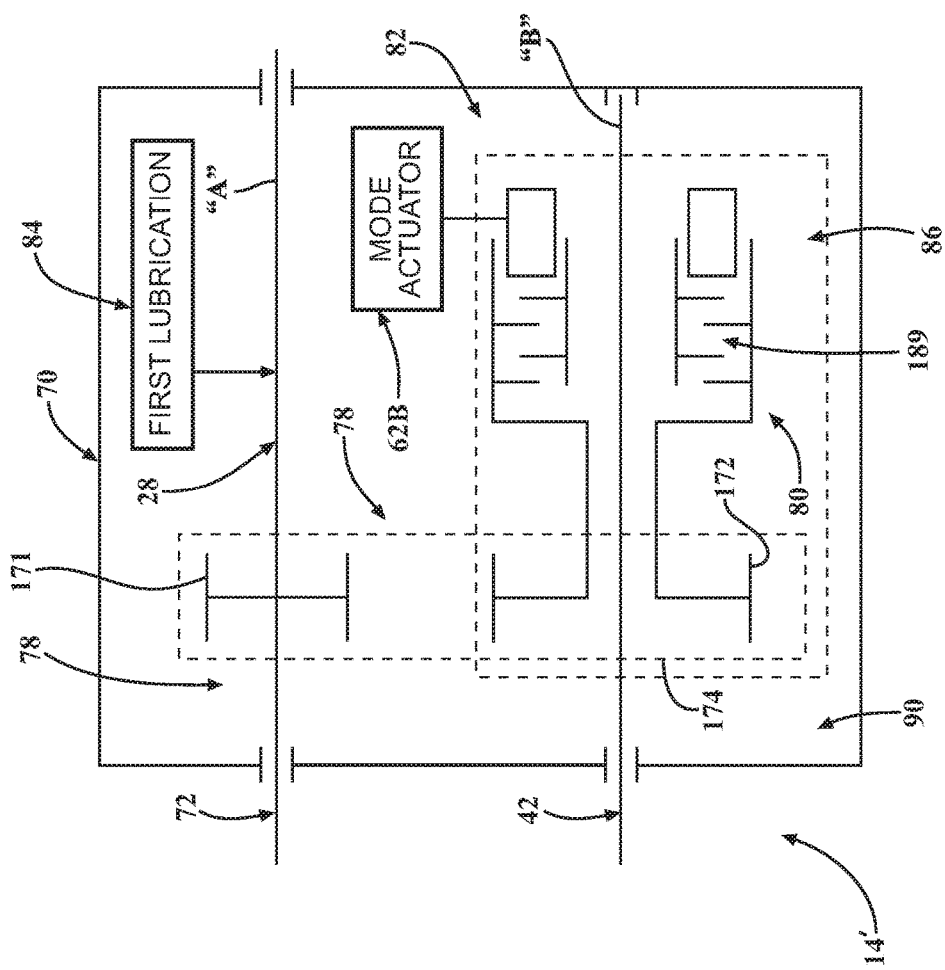
FIG. 2B is a diagrammatical illustration of a one-speed version of an active transfer case based on the two-speed active transfer case of FIG. 2A.

Referring now to FIG. 2A of the drawings, a stick diagram of an example embodiment of transfer case 14 constructed in accordance with the teachings of the present disclosure is provided. Transfer case 14 is generally shown to include: a housing assembly 70; an input shaft 72 rotatably supported by housing assembly 70; a two-speed range mechanism 74 disposed between input shaft 72 and rear output shaft 28; a range shift mechanism 76 controlling operation of two-speed range mechanism 74; a transfer mechanism 78 driven by rear output shaft 28; a mode mechanism 80 disposed between transfer mechanism 78 and front output shaft 42; a mode shift mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of transfer case 14 while mode mechanism 80 is arranged in association with a second rotary axis "B" of transfer case 14. With transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Transfer case 14 is also shown in FIG. 2A to include range actuator 62A in association with range shift mechanism 76, and mode actuator 62B in association with mode shift mechanism 80 which is controlled by controller unit 56. While transfer case 14 is shown to be directed to a two-speed version based on inclusion of range mechanism 74 and range shift mechanism 76, it will be understood that a one-speed version of transfer case 14 is intended to be within the scope of this disclosure. To better illustrate the contemplated arrangement, a one-speed version of transfer case 14 is shown in FIG. 2B and is identified by reference number 14'.

Figure 3:
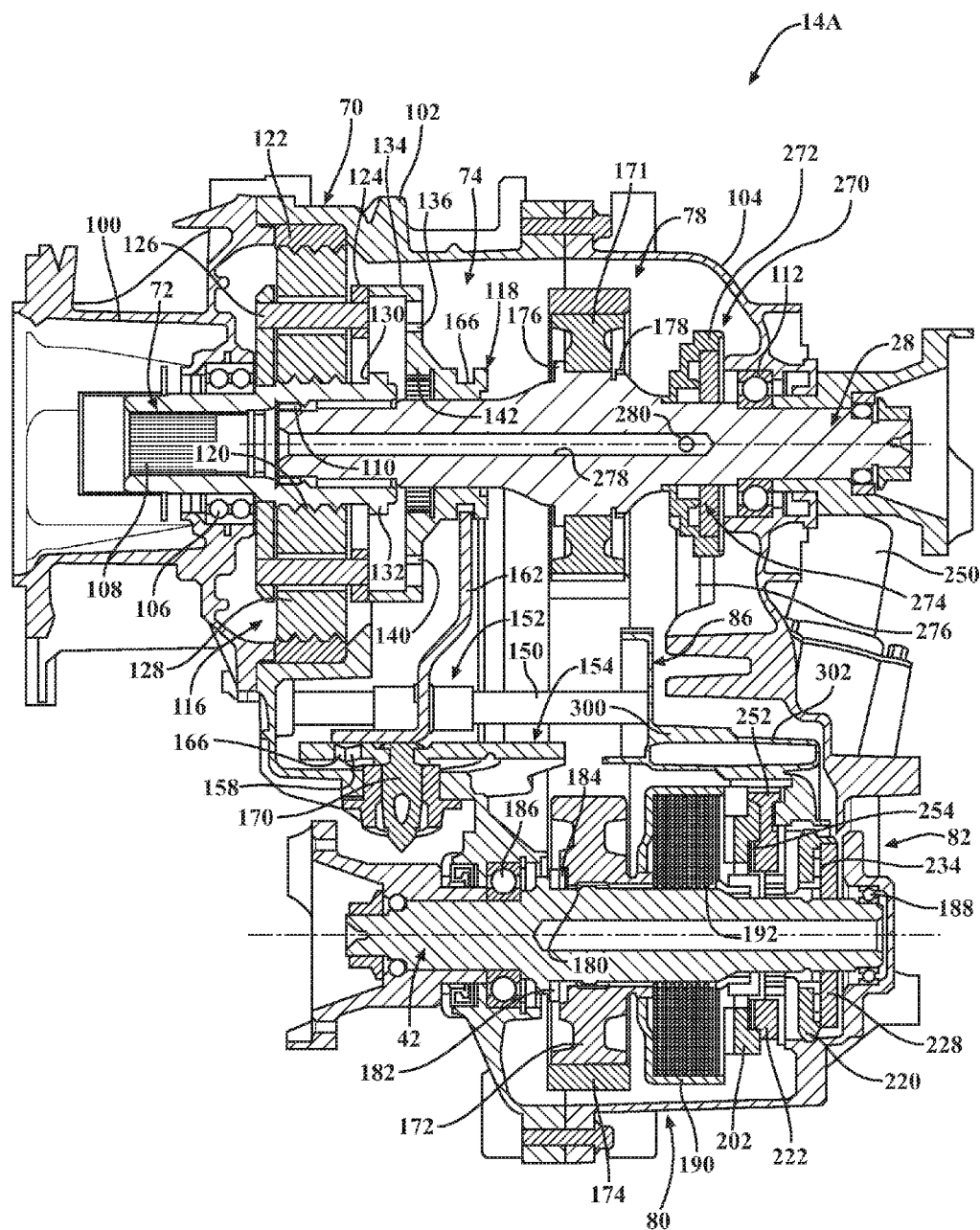
FIG. 3 is a sectional view of the two-speed active transfer case constructed in accordance with one embodiment of the present disclosure.

With particular reference now to FIG. 3, a first embodiment of transfer case 14 originally shown in FIGS. 1 and 2, is identified by reference numeral 14A. Housing assembly 70 is shown, in this non-limiting example, to include a multi-piece configuration having an adapter housing section 100, a front housing section 102, a rear housing section 104, and a rear end cap 105. Adapter housing section 100 is configured to be rigidly secured to transmission 22 and includes a bearing assembly 106 rotatably supporting input shaft 72. Input shaft 72 includes internal splines 108 adapted to matingly engage with external splines of a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown, in this non-limiting embodiment, to include a planetary gearset 116 and a range clutch 118. Planetary gearset 116 includes a sun gear 120 formed integrally on input shaft 72, a ring gear 122 non-rotatably fixed to front housing section 102, a carrier unit 124 having a plurality of pins 126, and a plurality of planet gears 128 each rotatably mounted (via a bearing assembly) on a corresponding one of pins 126 and which are each in constant meshed engagement with sun gear 120 and ring gear 122. Input shaft 72 includes a clutch ring segment 130 having external clutch teeth 132 formed thereon. Carrier unit 124 includes a clutch ring segment 134 having internal clutch teeth 136 formed thereon. Range clutch 118 is configured as a sliding range collar that is splined for common rotation with rear output shaft 28. Range collar 118 also includes external clutch teeth 140 and internal clutch teeth 142. Range clutch 118 is axially moveable on rear output shaft 28 between three (3) distinct range positions.

Range collar 118 is moveable between a high-range (H) position, a neutral (N) position, and a long-range (L) position. When range collar 118 is located in its H range position, its internal clutch teeth 142 engage external clutch teeth 132 on input shaft 72 so as to establish a first or "direct" (i.e., high-range) speed ratio drive connection between input shaft 72 and rear output shaft 28. In contrast, when range collar 118 is located in its L range position, its external clutch teeth 140 engage internal clutch teeth 136 on carrier unit 124 so as to establish a second or "reduced" (i.e., low-range) speed ratio drive connection between input shaft 72 and rear output shaft 28. Location of range collar 118 in its N position disengages rear output shaft 28 from driven connection with input shaft 72 and carrier unit 124 so as to interrupt the transfer of drive torque and permit relative rotation therebetween. Accordingly, the high-range drive connection is established when range collar 118 is located in its H range position and the low-range drive connection is established when range collar 118 is located in its L range position. The two-speed range mechanism shown and described is intended to exemplify any suitable gear reduction device capable of establishing two distinct speed ratio drive connections between input shaft 72 and rear output shaft 42.

Range shift mechanism 76 is shown, in the non-limiting embodiment, to include a shift rail 150 mounted between front and rear housing sections 102 and 104 of housing assembly 70, a range fork unit 152 slideably disposed on shift rail 150, and a rotary sector plate 154 having a contoured range slot 156 within which a range pin 158 extends. Range pin 158 extends outwardly from a tubular hub segment 160 of range fork unit 152 such that rotation of sector plate 154 causes linear movement of range fork unit 152 due to range pin 158 moving within range slot 156. Range fork unit 152 further includes a fork segment 162 extending outwardly from hub segment 160 and having a pair of bifurcated forks 164 that are retained in an annular groove 166 formed in range collar 118. Therefore, axial movement of range fork unit 152 results in sliding movement of range collar 118 between its three distinct range positions. While not specifically shown, a power-operated version of range actuator 62A may include an electric motor for rotatably driving a sector shaft 170 that is, in turn, coupled to sector plate 154 so as to move range collar 118 into the desired range position in response to rotation of sector shaft 170. As an alternative, and in accordance with a preferred configuration, range actuator 62A includes a mechanical linkage assembly interconnecting the shift lever in the passenger compartment of vehicle 10 to sector shaft 170 and which is operable to cause rotation of sector plate 154 in response to movement of the shift lever. Those skilled in the art will appreciate that any suitable arrangement capable of axially moving range fork unit 152 to facilitate movement of range collar 118 between its three (3) distinct range positions is within the meaning of range actuator 92.

Transfer mechanism 78 is shown in the non-limiting example, to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and an endless power chain 174 encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with transfer case 14A to transfer drive torque from rear output shaft 28 to a transfer component rotatably supported on front output shaft 42.

Figure 7:
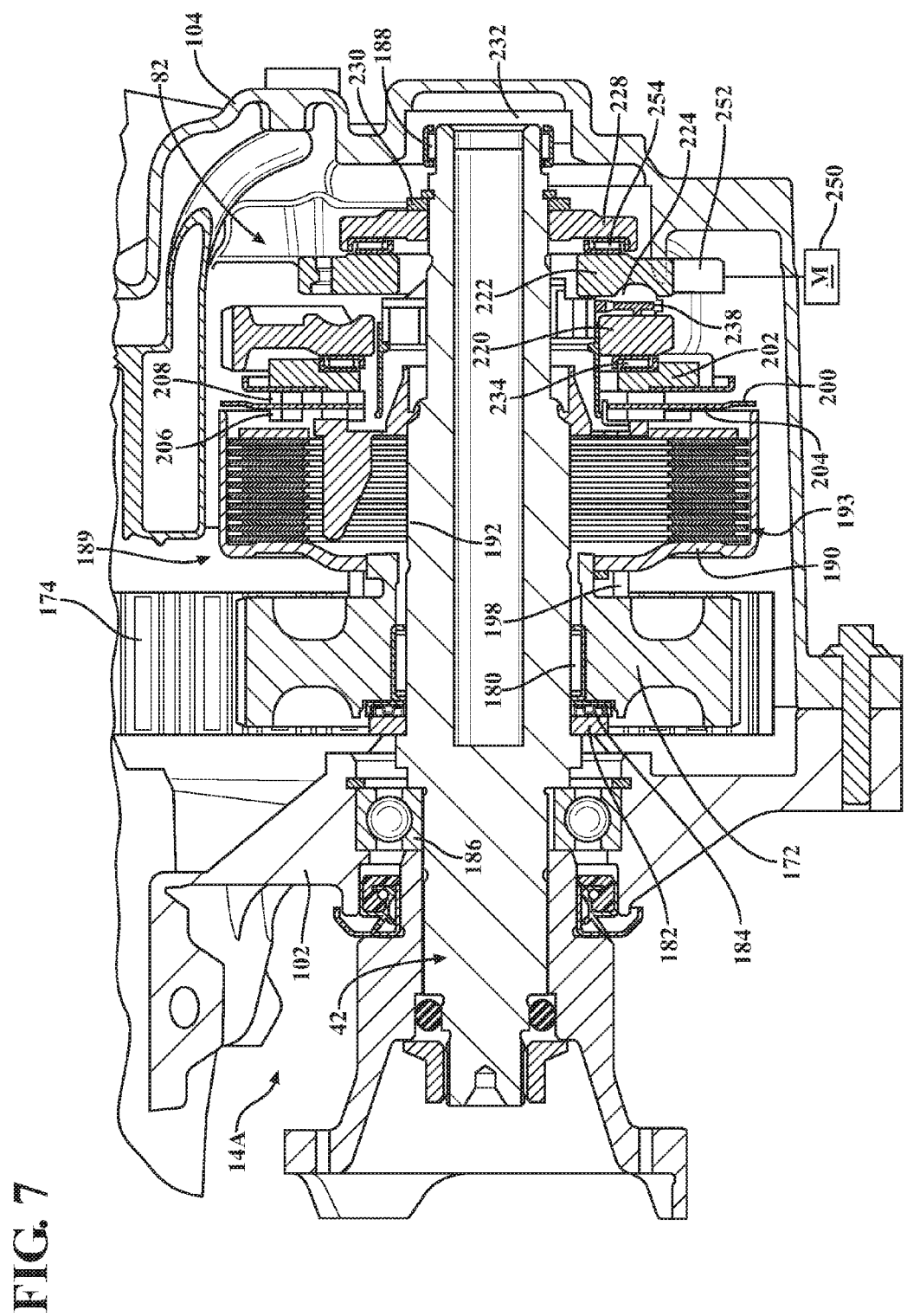
FIG. 7 is an enlarged partial sectional view showing various components of the active mode clutch associated with the transfer cases shown in FIGS. 3 through 6.

Mode mechanism 80 is best shown, in this non-limiting example, of FIGS. 3 and 7, to include a wet-type friction clutch assembly 189 disposed between second sprocket 172 and front output shaft 42 for facilitating adaptive torque transfer therebetween. Friction clutch assembly 189 generally includes a first clutch member or clutch drum 190 fixed for common rotation with second sprocket 172, a second clutch member or clutch hub 192 mounted to, formed integrally with, an intermediate section of front output shaft 42, and a multi-plate clutch pack 193 comprised of alternatively interleaved outer clutch plates 194 and inner clutch plates 196. Outer clutch plates 194 are splined for rotation with clutch drum 190 while inner clutch plates 196 are splined for rotation with clutch hub 192. Clutch drum 190 is a formed component and includes a plurality of oil transfer holes (not shown) configured to permit lubricant to flow therethrough. A spacer ring 198 is provided between drum 190 and second sprocket 172.

Friction clutch assembly 189 also includes a spring retainer ring 200 fixed (via splines, lugs, etc.) for common rotation with clutch drum 190, an axially-moveable apply plate 202 that is connected for common rotation with spring retainer ring 200, and a plurality of circumferentially aligned return springs 204 disposed between spring retainer ring 200 and apply plate 202. As will be detailed, return springs 204 are configured and arranged to normally bias apply plate 202 in a direction toward a retracted position relative to clutch pack 193. Apply plate 202 includes a plurality of axially-extending and circumferentially-aligned drive lugs 206 which extend through window apertures 208 formed in spring retainer ring 200. Drive lugs 206 are configured to engage and apply a clutch engagement force on clutch pack 193, the magnitude of which controls the amount of drive torque that is transferred from clutch drum 190 to clutch hub 192 through clutch pack 193. While mode mechanism 80 is shown preferably configured as a multi-plate wet-type friction clutch assembly, those skilled in the art will recognize that such a mode mechanism is intended to represent any type of actively-controlled mode clutch or coupling capable of selectively coupling front output shaft 42 for rotation with second sprocket 172 of transfer mechanism 78 for facilitating the transfer of drive torque to front driveline 18.

Mode shift mechanism 82 is best shown, in the non-limiting example of FIGS. 3 and 7, to include a motor-driven rotary-to-linear conversion device of the type commonly referred to as a ballramp unit. The ballramp unit generally includes a first cam ring 220, a second cam ring 222, and followers 224 disposed in aligned cam tracks formed therebetween. First cam ring 220 is non-rotatably fixed to housing assembly 70 via an anti-rotation tab 226. First cam ring 220 is also fixed axially and is located against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks 236 which followers 224 engage. Second cam ring 222 includes a matching plurality of second cam tracks 240 against which followers 224 also rollingly engage. A pair of cage plates 238 retain and align followers 224 relative to first cam tracks 236 and second cam tracks 240. Second cam ring 222 is adapted to move axially relative to first cam ring 220 as a result of rotation of second cam ring 222 relative to first cam ring 220. As such, the profile and/or contour of cam tracks 236 and 240 controls the linear motion of second cam ring 222. An electric motor 250 acts as mode actuator 62B and has a rotary output driving a gear (not shown) that is meshed with geared rack segment 252 of second cam ring 222. As will be understood, the direction and amount of rotation of the electric motor's output controls the direction and amount of rotation of second cam ring 222 which, in turn, controls the direction and amount of axial travel of second cam ring 222 relative to the clutch pack. A thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222. Those skilled in the art will appreciate that the alternative ballramp unit where one or both cam rings are rotatable to establish axial movement of one of the cam rings is within the scope of the ballramp unit disclosed herein. Additionally, other rotary-to-linear conversion devices (i.e., ballscrew units), camming devices or pivotable devices configured to control the magnitude of the clutch engagement force applied to clutch pack 193 are considered alternatives for mode shift mechanism 82.

Second cam ring 222 is configured to control axial movement of apply plate 202 between a first or minimum clutch engagement position and a second or maximum clutch engagement position relative to clutch pack 193 of friction clutch assembly 189. With apply plate 202 axially located in its first position, a predetermined minimum clutch engagement force is exerted by drive lugs 206 on clutch pack 193, thereby transferring a minimum amount of drive torque from rear output shaft 28 (through transfer mechanism 78) to front output shaft 42. Typically, no drive torque is transmitted from rear output shaft 28 and transfer mechanism 74 through friction clutch assembly 189 when apply plate 202 is located in its first position, thereby establishing a "released" mode for friction clutch assembly 189 and a two-wheel drive mode (2WD) for transfer case 14A. In contrast, with apply plate 202 axially located in its second position, a predetermined maximum clutch engagement force is exerted by drive lugs 206 on clutch pack 193, thereby transferring a maximum amount of drive torque through friction clutch assembly 189 to front output shaft 42. In this position, a "fully engaged" mode is established for friction clutch assembly 189 and a locked four-wheel drive mode (LOCK-4WD) is established for transfer case 14A. Precise control over the axial location of apply plate 202 between its first and second positions permits adaptive torque transfer from rear output shaft 28 to front output shaft 42 so as to establish an on-demand four-wheel drive (AUTO-4WD) mode for transfer case 14A. Return springs 204 react between spring retainer ring 200 and apply plate 202 so as to normally bias apply plate 202 toward its first position. Those skilled in the art will recognize that mode shift mechanism 82 can be any suitable power-operated arrangement operable for controlling movement of apply plate 202 relative to clutch pack 193. While not shown, a power-off brake can be associated with motor 250 which functions to mechanically hold apply plate 202 in its second position to establish the LOCK-4WD mode and allow motor 250 to be turned off when one of the LOCK-4WD modes is selected.

First lubrication mechanism 84 is shown, in this non-limiting example, to include a lube pump 270 having a pump housing 272 non-rotatably fixed to housing assembly 70, and a pump assembly 274 disposed in a pump chamber formed within housing 272. Pump assembly 274 has a rotary pump member fixed for rotation with rear output shaft 28 and which is operable for drawing lubricant from sump area 90 (through a supply tube 276) into a suction-side inlet portion of the pump chamber formed in pump housing 272. Rotation of the rotary pump member caused by rotation of rear output shaft 28 causes the lubricant to be pressurized and discharged from a pressure-side discharge portion of the pump chamber for delivery to a central lube channel 278 formed in rear output shaft 28 via one or more radial feed ports 280. Thereafter, the lubricant in control lube channel 278 is radially dispersed via radial discharge ports to provide lubricant to the various rotary components aligned with the "A" axis. In one embodiment, lube pump 270 could be a gerotor pump.

Second lubrication mechanism 86 is shown, in this non-limiting embodiment, to be configured to catch lubricant splashed from clutch drum 190, second sprocket 172 and chain 174 and to transfer the captured lubricant for use in lubricating and cooling components associated with mode mechanism 80 and other rotary components aligned with the "B" axis. In general, second lubrication mechanism 86 is a "splash recovery" lubrication system that is operable for use in power transfer units having a multi-plate friction clutch assembly disposed, at least partially, for rotation in a lubricant sump, such as sump area 90. The splash recovery clutch lubrication system associated with the various transfer cases of the present disclosure is applicable to other power transfer units of the type used in vehicular drivetrain applications to provide a "pumpless" solution to lubricating rotary components aligned for rotation along a rotary axis positioned in proximity to a lubrication sump. The splash recovery clutch lubrication system provides a means for supplying lubricant to a control portion of a rotating clutch located in the lubricant sump. The present disclosure also eliminates pump priming concerns at low RPM since as the rotational speed increases, the lubricant splashes and reduces the sump height. However, the recovery system feeds lubricant back into the clutch system without concerns related to conventional pump priming. Other resulting advantages include minimized spin losses, weight savings, improved packaging and noise reduction over conventional pump systems. While not limited thereto, one example of a splash-type lubrication mechanism 82 is shown and disclosed in commonly-owned U.S. application Ser. No. 14/718,798 filed May 21, 2015, the entire disclosure of which is incorporated herein by reference.

Figure 4:
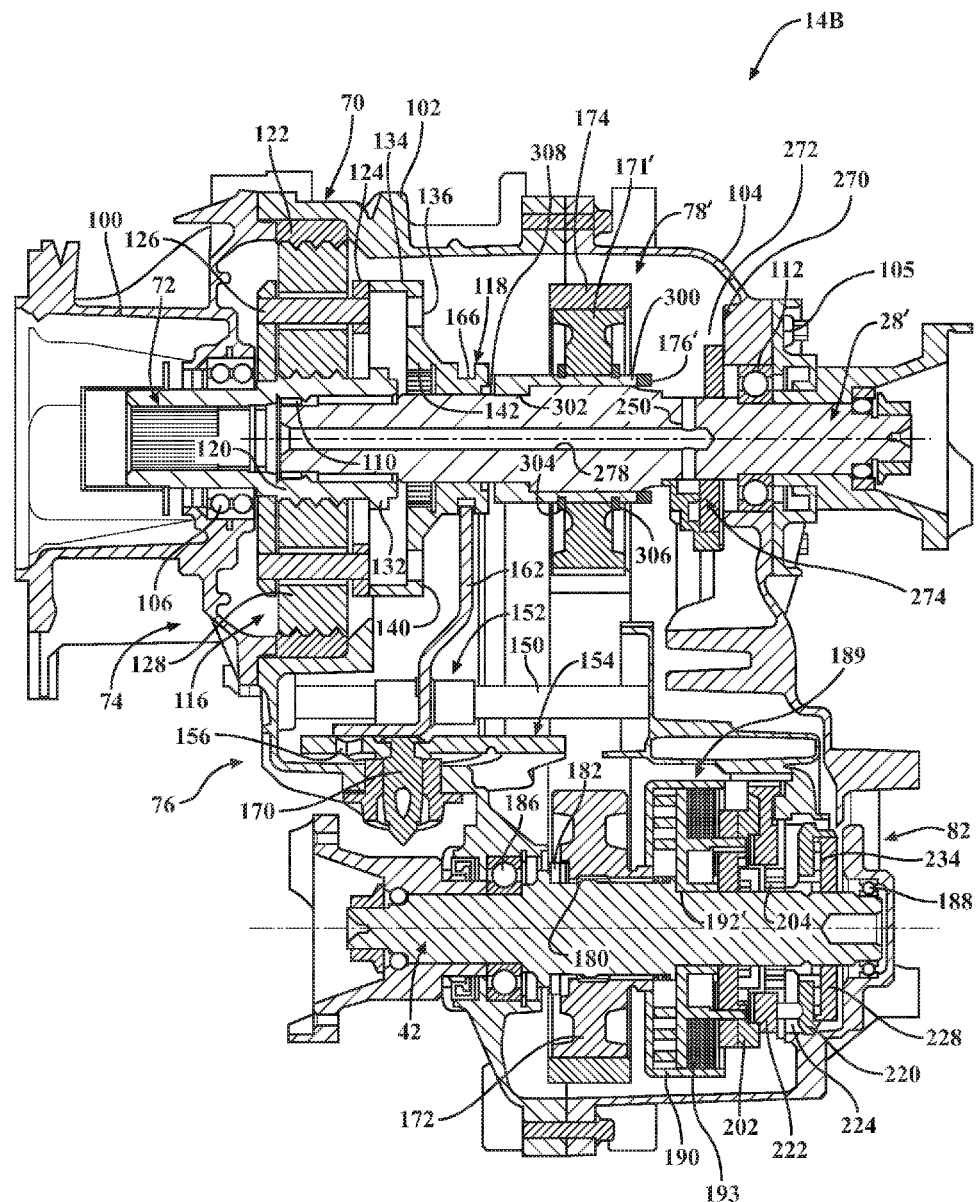
FIG. 4 is a sectional view of a two-speed active transfer case constructed in accordance with a second embodiment of the present disclosure.

Referring now to FIG. 4, an alternative embodiment of transfer case 14 is identified by reference numeral 14B. Transfer case 14B is substantially similar in construction and function to transfer case 14A of FIG. 3, with the exception that first sprocket 171' is now drivingly coupled (i.e., splined) to a drive hub 300 which, in turn, is coupled via a splined connection 302 to rear output shaft 28'. A pair of retainer rings 304, 306 axially restrain and locate first sprocket 171' on drive hub 300. Drive hub 300 is retained and axially positioned against a radial shoulder 176' of rear output shaft 28' via a snap ring 308. In addition, clutch hub 192' is now a separate clutch component splined to front output shaft 28. Due to the similarity of the remaining components of transfer case 14B to the previously described components associated with transfer case 14A, common reference numerals are used to identify similar components and further description is not otherwise required. Suffice it to say that transfer case 14B is a two-speed active transfer case capable of establishing all of the drive modes described in relations to transfer case 14A.

Figure 5:
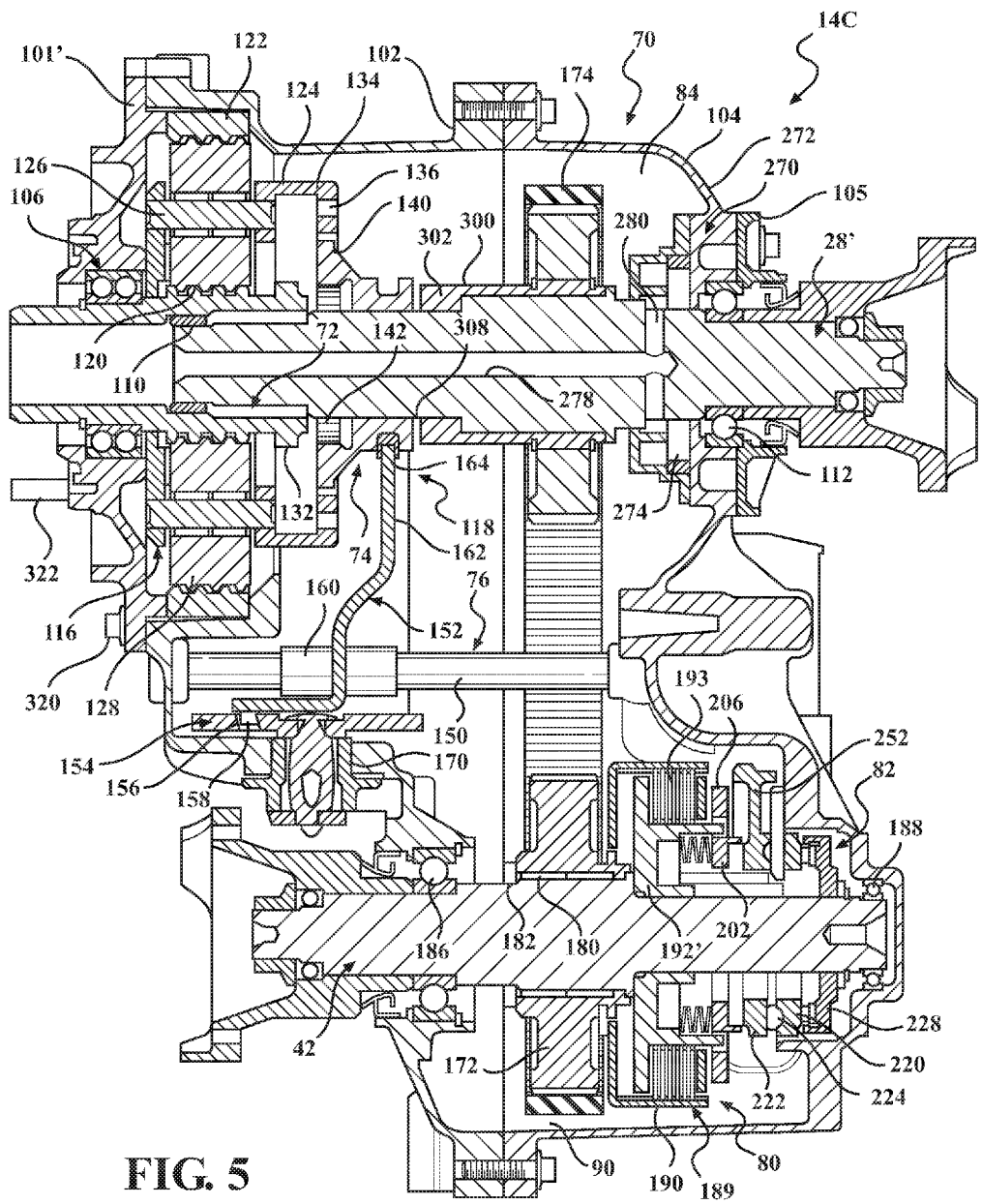
FIG. 5 is a sectional view of a two-speed active transfer case constructed in accordance with a third embodiment of the present disclosure.

Referring to FIG. 5, another alternative embodiment of transfer case 14 is identified by reference numeral 14C. Transfer case 14C is substantially similar in construction and functional operation to transfer case 14B of FIG. 4 with the exception that a modified adapter housing section 101' is now associated with multi-piece housing 70. Adapter 101' is secured to housing section 102 via bolts 320 and includes a plurality of mounting studs 322 arranged for retention in alignment apertures formed in the transmission housing. Input shaft 72 extends outwardly from adapter housing 101'. The various arrangements shown in FIGS. 3 through 5 are provided to illustrate the modularity associated with the present disclosure.

Figure 6:
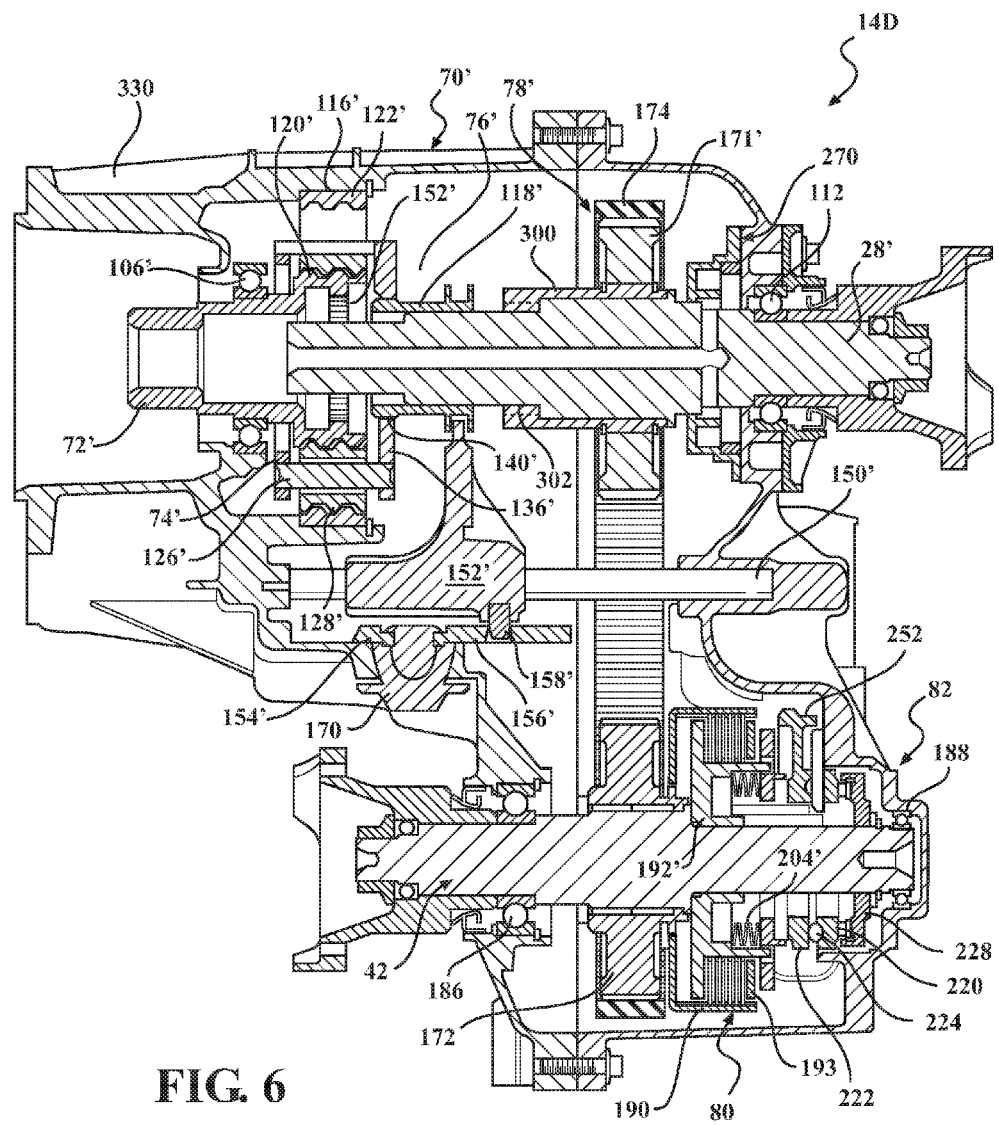
FIG. 6 is a sectional view of a two-speed active transfer case constructed in accordance with a fourth embodiment of the present disclosure.

Referring to FIG. 6, yet another alternative embodiment of transfer case 14 is identified by reference numeral 14D. Transfer case 14D is generally similar to transfer cases 14A-14C in structure and functional operation but is now configured to include a slightly modified range shift mechanism 76' and range mechanism 74' in combination with a modified housing assembly 70'. Housing assembly 70' is now shown with adapter section 100 and first housing section 102 of transfer case 14A integrated into a common housing section 330. In addition, input shaft 72' is now shown with sun gear 120' formed on a radially enlarged hub section and which defines internal sun gear clutch teeth 132'. External clutch teeth 140' on range collar 118' are now configured to engage carrier clutch teeth 136' when range collar 118' is located in its L range position to engage sun gear clutch teeth 132' when range collar 118' is located in its H range position. In addition, range shift mechanism 76' now includes a range fork 152' slideably mounted on shift rail 150' with its range pin 158' retained in a range slot 165' formed in sector plate 154'. Mode clutch 80 and mode actuator 82 are similar to the arrangements previously disclosed.

Figure 8:
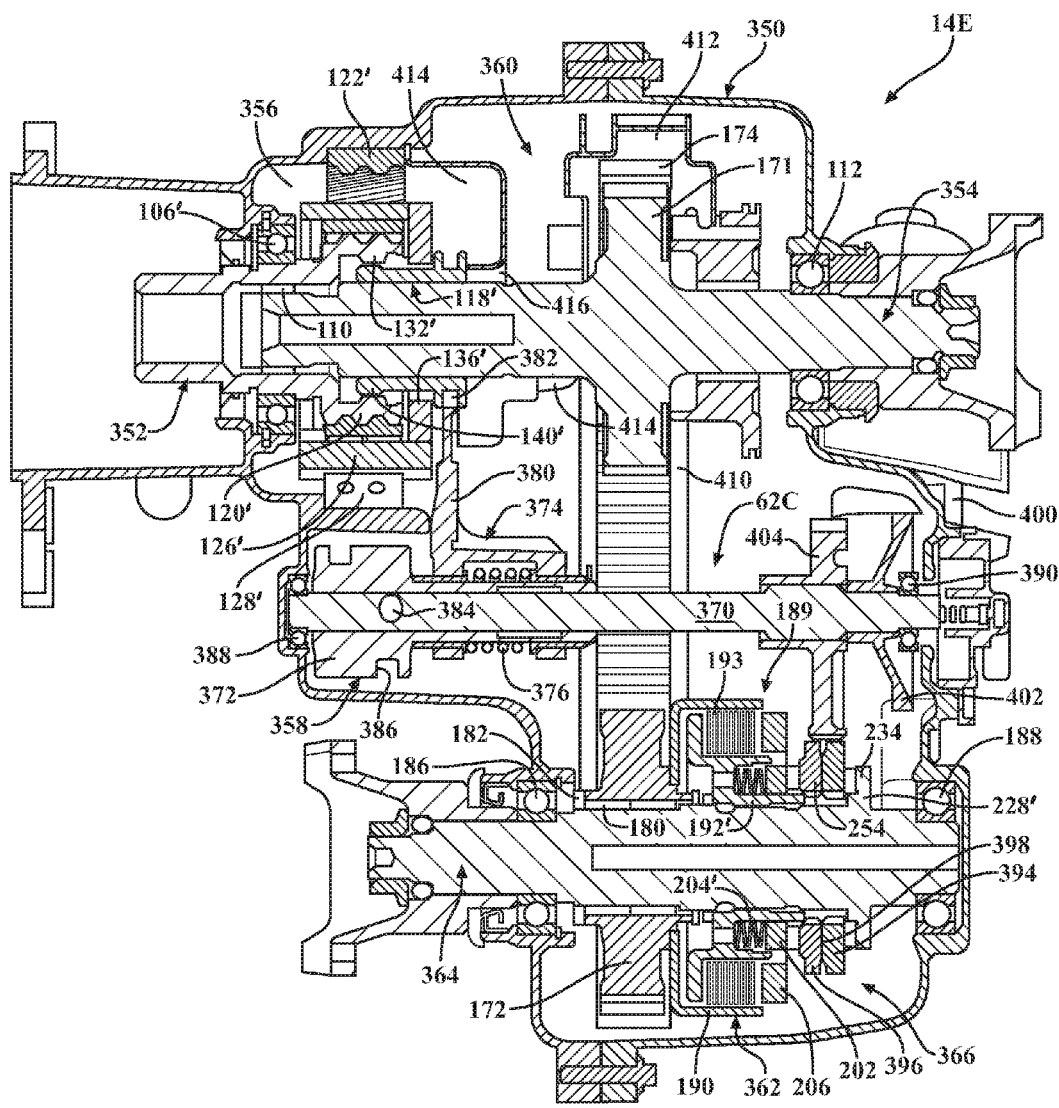
FIG. 8 is a sectional view of a two-speed active transfer case constructed in accordance with a fourth embodiment of the present disclosure.

Referring now to FIG. 8, another alternative embodiment of transfer case 14 is identified by reference numeral 14E. Transfer case 14E differs from the previously disclosed alternative embodiments of transfer case 14 in that it is equipped with an integrated power-operated range actuator and mode actuator, hereinafter identified as power-operated shift actuator 62C. Transfer case 14E is generally shown to include: a housing assembly 350; an input shaft 352 rotatably supported by housing assembly; a rear output shaft 354 rotatably supported by input shaft 352 and housing assembly 350; a two-speed range mechanism 356 disposed between input shaft 352 and rear output shaft 354; a range shift mechanism 358 controlling operation of two-speed range mechanism 356; a transfer mechanism 360 driven by rear output shaft 354; a mode mechanism 362 disposed between transfer mechanism 360 and a front output shaft 364; a mode shift mechanism 366 controlling operation of mode mechanism 362; and a splash lubrication system 368, all in addition to power-operated shift actuator 62C. As before, range mechanism 356 is arranged in association with a first rotary axis "A" that is shared with input shaft 352 and rear output shaft 354 while mode mechanism 362 and front output shaft share a second rotary axis "B".

Two-speed range mechanism 356 is generally similar to two-speed range mechanism 74' of FIG. 6 and includes planetary gearset 116' and range clutch 118'. Range clutch 118' is a sliding range collar moveable between the H, N, L range positions relative to planetary gearset 116'. Operation of range shift mechanism 358 and mode shift mechanism 366 is controlled and coordinated by power-operated shift actuator 62C. Range shift mechanism 358 generally includes a rotary shift shaft 370, a range cam 372 supported for axial movement on shift rail 370, and a range fork unit 374 mounted via a spring-loaded mechanism 376 on a tube segment 378 of range cam 372. Range fork unit 374 has a fork section 380 engaging a groove 382 formed in range collar 118'. A range pin 384 is fixed for rotation with shift shaft 370 and extends into a contoured range shift groove 386 formed in range cam 372. Shift shaft 370 is shown rotatably supported in housing assembly 350 via a pair of laterally spaced bearings 388, 390. Spring-loaded mechanism 376 is provided to permit axial movement of range cam 372 when a "tooth block" condition exists between range collar 118' and the clutching components of planetary gearset 356 to the desired range position following release of the tooth block condition.

Transfer mechanism 360 is generally similar to transfer mechanism 78 of FIG. 3 and includes first sprocket 171 formed on rear output shaft 354, a second sprocket 172 rotatably supported on front output shaft 364, and an endless power chain 174 encircled therebetween. Mode mechanism 362 is also generally similar to mode mechanism 80 shown in FIGS. 4-6 and includes friction clutch assembly 189 with the components thereof identified by common reference numbers. Mode shift mechanism 366 is a slightly modified version of the ballramp unit and has a first cam plate 394, second cam plate 396, and roller 398 retained in cam tracks formed in the first and second cam plates. First cam plate 394 is supported against a backing ring 228' extending integrally from front output shaft 364 via a bearing assembly 234. Another bearing assembly 254 is positioned between second cam plate 396 and apply plate 202.

In accordance with the construction shown in FIG. 8, power-operated shift actuator 62C includes an electric motor 400 having a rotary output configured to drive a reduction gear 402 fixed (i.e., splined) for rotation with shift shaft 370. A mode cam 404, associated with mode shift mechanism 366, is fixed for rotation with shift shaft 370. Mode cam 404 includes a first cam surface against which a first follower segment of first cam plate 394 rests, and a second cam surface against which a second follower segment of second cam plate 396 rests. The configuration of the first and second cam surfaces are selected to cause at least one of first cam plate 394 and second cam plate 396 to rotate relative to the other which, in turn, results in axial movement of second cam plate 396. This axial movement results in corresponding axial movement of apply plate 202 relative to clutch pack 193, thereby providing adaptive torque transfer between second sprocket 172 and front output shaft 364. Accordingly, the configuration of range groove 386 in range cam 372 and the configuration of the mode cam tracks on mode cam 404 are selective to facilitate coordinated movement of range fork unit 374 and apply plate 202 to establish each of the available drive modes.

Splash lubrication system 368 is shown in FIG. 8 to be configured as a "pumpless" arrangement operable to circulate lubricant splashed during rotation of second sprocket 172 and chain to lubricate components aligned on the rotary axis of front output shaft 364 as well as the rotary axis of rear output shaft 354. Lubrication system 368 is shown to include a guide housing 410 generally enclosing a portion of power chain 174 and first sprocket 171. Guide housing 410 defines a lubricant reservoir segment 412 configured to collect the lubricant. A tube 414 fluidically connects reservoir segment 412 to a lube chamber 414 formed with a bell-shaped lube housing 416 configured to enclose and separate planetary range mechanism 356. This arrangement is configured to direct lubricant to rotary components on mainshaft 352/354.

Alternative power-operated shift actuators can be used without limiting the present disclosure. For example, commonly-owned U.S. Pat. No. 6,645,109 discloses a gear drive arrangement between the shift shaft and one of the cam plates of a ballramp unit. Likewise, commonly-owned U.S. Pat. No. 7,540,820 discloses a cam arrangement between the shift shaft and one of the cam plates of a ballramp unit. Finally, U.S. Pat. No. 7,694,598 discloses an arrangement including coordinated rotation of a range cam and a mode cam. The arrangements disclosed in each of the above-noted patents are incorporated herein by reference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transfer case for use in a four-wheel drive motor vehicle having a powertrain and first and second drivelines, comprising:
    an input shaft adapted to receive drive torque from the powertrain and aligned for rotation about a first axis;
    a first output shaft adapted to be interconnected to the first driveline and aligned for rotation about said first axis;
    a second output shaft adapted to be interconnected to the second driveline and aligned for rotation about a second axis;
    a transfer mechanism having a first transfer component fixed for rotation with said first output shaft about said first axis, and a second transfer component rotatably supported on said second output shaft for rotation about said second axis, said second transfer component being driven by said first transfer component;
    a range mechanism including a reduction unit and a range clutch, said reduction unit being driven at a reduced speed relative to said input shaft, said range clutch operable in a first range position to establish a drive connection between said input shaft and said first output shaft and further operable in a second position to establish a drive connection between said reduction unit and said first output shaft;
    a range shift mechanism controlling movement of said range clutch between said first and second range positions;
    a mode mechanism disposed between said second transfer component and said second output shaft, said mode mechanism including a mode clutch having a first clutch member coupled to said second transfer component, a second clutch member coupled to said second output shaft, a multi-plate clutch pack disposed between said first and second clutch members, and an apply member moveable into and out of engagement with said clutch pack;
    a mode shift mechanism for controlling movement of said apply member relative to said clutch pack so as to control the magnitude of a clutch engagement force applied to said clutch pack and concurrently control the amount of drive torque transferred from said first output shaft through said transfer mechanism and said mode clutch to said second output shaft; and
    a power-operated shift actuator for controlling actuation of said mode shift mechanism, wherein said power-operated shift actuator includes a shift shaft aligned for rotation about a third axis, an electric motor for rotating said shift shaft, a range actuator driven by said shift shaft for causing said range shift mechanism to move said range clutch between its first and second range positions, and a mode actuator driven by said shift shaft for causing said mode shift mechanism to move said apply member between first and second mode positions relative to said clutch, and wherein said apply member is operable in said first mode position to transfer a first magnitude of drive torque through said clutch pack to said second output shaft and further operable in said second mode position to transfer a second magnitude of drive torque through said clutch pack to said second output shaft.

2. The transfer case of claim 1 wherein said power-operated shift actuator is further operable for controlling actuation of said range shift mechanism.

3. The transfer case of claim 1 wherein said range shift mechanism is coupled to a shift lever operated by a vehicle operator such that movement of said shift lever causes movement of said range clutch.

4. The transfer case of claim 1 wherein said mode actuator includes a mode cam driven by said shift shaft and a ballramp unit having first and second cam plates, wherein said mode cam is engaged by at least one of said first and second cam plates such that rotation of said mode cam causes relative rotation between said first and second cam plates which results in axial movement of one of said first and second cam plates, said axial movement of said axially moveable one of said first and second cam plates results in concurrent axial movement of said apply member between said first and second mode positions.

5. The transfer case of claim 4 wherein said range actuator includes a range cam, wherein said range shift mechanism includes a range fork engaging said range clutch, wherein rotation of said range cam in response to rotation of said shift shaft causes axial movement of said range fork, and wherein axial movement of said range fork results in movement of said range clutch between said first and second range positions.

6. The transfer case of claim 1 wherein said reduction unit is a planetary gearset having a sun gear driven by said input shaft, a non-rotary ring gear, a carrier, and a plurality of planet gears each rotatably supported by said carrier and in meshed engagement with said sun gear and said ring gear, wherein said range clutch includes a range collar coupled for rotation with and sliding movement on said first output shaft, wherein said range collar is operable in said first range position to couple said sun gear for rotation with said first output shaft and is further operable in said second range position to couple said carrier for rotation with said first output shaft.

7. The transfer case of claim 1 wherein said transfer mechanism includes a first sprocket drivingly coupled to said first output shaft, a second sprocket rotatably supported on said second output shaft, and a power chain encircling said first and second sprockets for transferring drive torque from said first output shaft to said second sprocket, wherein said first clutch member is a clutch drum fixed for rotation with said second sprocket and said second clutch member is a clutch hub fixed for rotation with said second shaft.

8. A transfer case for use in a four-wheel drive motor vehicle having a powertrain and first and second drivelines, comprising:
a housing assembly;
an input shaft supported by said housing assembly and disposed along and rotatable about a first axis and adapted to receive drive torque from the powertrain;
a first output shaft supported by said housing assembly and disposed along and rotatable about said first axis and adapted to be interconnected to the first driveline;
a second output shaft supported by said housing assembly and disposed along and rotatable about a second axis and adapted to be interconnected to the second driveline;
a transfer mechanism having a first transfer component fixed for rotation with said first output shaft about said first axis, and a second transfer component rotatably supported on said second output shaft for rotation about said second axis, said second transfer component being driven by said first transfer component;
a range mechanism including a reduction unit and a range clutch, said reduction unit being driven at a reduced speed relative to said input shaft, said range clutch operable in a first range position to establish a drive connection between said input shaft and said first output shaft and further operable in a second position to establish a drive connection between said reduction unit and said first output shaft;
a range shift mechanism controlling movement of said range clutch between said first and second range positions;
a mode mechanism disposed between said second transfer component and said second output shaft, said mode mechanism including a mode clutch having a first clutch member coupled to said second transfer component, a second clutch member coupled to said second output shaft, a multi-plate clutch pack disposed between said first and second clutch members, and an apply member moveable into and out of engagement with said clutch pack;
a mode shift mechanism for controlling movement of said apply member relative to said clutch pack so as to control the magnitude of a clutch engagement force applied to said clutch pack and concurrently control the amount of drive torque transferred from said first output shaft through said transfer mechanism and said mode clutch to said second output shaft;
a power-operated shift actuator for controlling actuation of said mode shift mechanism;
a splash lubrication system including a sump area defined by said housing assembly and filled with a lubricating oil; and
said mode mechanism at least partially disposed in said sump area for lubricating said mode mechanism with said lubricating oil,
wherein said transfer mechanism includes a first sprocket drivingly coupled to said first output shaft, a second sprocket rotatably supported on said second output shaft, and a power chain encircling said first and second sprockets for transferring drive torque from said first output shaft to said second sprocket,
wherein said first clutch member is a clutch drum fixed for rotation with said second sprocket and said second clutch member is a clutch hub fixed for rotation with said second shaft, and
wherein said splash lubrication system includes a guide housing enclosing at least a portion of said power chain and said first sprocket.

9. The transfer case of claim 8 wherein said splash lubrication system further includes a lube housing enclosing said range mechanism; and a tube fluidically connecting said guide housing and said lube housing to direct said lubricating oil to said range mechanism.

10. The transfer case of claim 8 wherein said power-operated shift actuator is further operable for controlling actuation of said range shift mechanism.

11. The transfer case of claim 8 wherein said range shift mechanism is coupled to a shift lever operated by a vehicle operator such that movement of said shift lever causes movement of said range clutch.

12. The transfer case of claim 8 wherein said power-operated shift actuator comprises:
a shift shaft aligned for rotation about a third axis;
an electric motor for rotating said shift shaft;
a range actuator driven by said shift shaft for causing said range shift mechanism to move said range clutch between its first and second range positions;
a mode actuator driven by said shift shaft for causing said mode shift mechanism to move said apply member between first and second mode positions relative to said clutch, said apply member operable in said first mode position to transfer a first magnitude of drive torque through said clutch pack to said second output shaft and further operable in said second mode position to transfer a second magnitude of drive torque through said clutch pack to said second output shaft.

13. The transfer case of claim 12 wherein said mode actuator includes a mode cam driven by said shift shaft and a ballramp unit having first and second cam plates, wherein said mode cam is engaged by at least one of said first and second cam plates such that rotation of said mode cam causes relative rotation between said first and second cam plates which results in axial movement of one of said first and second cam plates, said axial movement of said axially moveable one of said first and second cam plates results in concurrent axial movement of said apply member between said first and second mode positions.

14. The transfer case of claim 13 wherein said range actuator includes a range cam, wherein said range shift mechanism includes a range fork engaging said range clutch, wherein rotation of said range cam in response to rotation of said shift shaft causes axial movement of said range fork, and wherein axial movement of said range fork results in movement of said range clutch between said first and second range positions.

15. A transfer case for use in a four-wheel drive motor vehicle having a powertrain and first and second drivelines, comprising:
a housing assembly;
an input shaft supported by said housing assembly and disposed along and rotatable about a first axis and adapted to receive drive torque from the powertrain;
a first output shaft supported by said housing assembly and disposed along and rotatable about said first axis and adapted to be interconnected to the first driveline;
a second output shaft supported by said housing assembly and disposed along and rotatable about a second axis and adapted to be interconnected to the second driveline;
a transfer mechanism having a first transfer component fixed for rotation with said first output shaft about said first axis, and a second transfer component rotatably supported on said second output shaft for rotation about said second axis, said second transfer component being driven by said first transfer component;
a range mechanism including a reduction unit and a range clutch, said reduction unit being driven at a reduced speed relative to said input shaft, said range clutch operable in a first range position to establish a drive connection between said input shaft and said first output shaft and further operable in a second position to establish a drive connection between said reduction unit and said first output shaft;
a range shift mechanism controlling movement of said range clutch between said first and second range positions;
a mode mechanism disposed between said second transfer component and said second output shaft, said mode mechanism including a mode clutch having a first clutch member coupled to said second transfer component, a second clutch member coupled to said second output shaft, a multi-plate clutch pack disposed between said first and second clutch members, and an apply member moveable into and out of engagement with said clutch pack;
a mode shift mechanism for controlling movement of said apply member relative to said clutch pack so as to control the magnitude of a clutch engagement force applied to said clutch pack and concurrently control the amount of drive torque transferred from said first output shaft through said transfer mechanism and said mode clutch to said second output shaft;
a power-operated shift actuator for controlling actuation of said mode shift mechanism, wherein said power-operated shift actuator includes a shift shaft aligned for rotation about a third axis, an electric motor for rotating said shift shaft, a range actuator driven by said shift shaft for causing said range shift mechanism to move said range clutch between its first and second range positions, and a mode actuator driven by said shift shaft for causing said mode shift mechanism to move said apply member between first and second mode positions relative to said clutch, said apply member operable in said first mode position to transfer a first magnitude of drive torque through said clutch pack to said second output shaft and further operable in said second mode position to transfer a second magnitude of drive torque through said clutch pack to said second output shaft; and
a splash lubrication system including a sump area defined by said housing assembly and filled with a lubricating oil,
wherein said mode mechanism is at least partially disposed in said sump area for lubricating said mode mechanism with said lubricating oil.

16. The transfer case of claim 15 wherein said mode actuator includes a mode cam driven by said shift shaft and a ballramp unit having first and second cam plates, wherein said mode cam is engaged by at least one of said first and second cam plates such that rotation of said mode cam causes relative rotation between said first and second cam plates which results in axial movement of one of said first and second cam plates, and wherein axial movement of said axially moveable one of said first and second cam plates results in concurrent axial movement of said apply member between said first and second mode positions.

17. The transfer case of claim 16 wherein said range actuator includes a range cam, wherein said range shift mechanism includes a range fork engaging said range clutch, wherein rotation of said range cam in response to rotation of said shift shaft causes axial movement of said range fork, and wherein axial movement of said range fork results in movement of said range clutch between said first and second range positions.

* * * * *